United States Patent [19]

Bevins

[11] Patent Number: 4,756,402
[45] Date of Patent: Jul. 12, 1988

[54] SIDE GUIDE FOR AIRCRAFT BELT LOADER

[75] Inventor: John R. Bevins, Orlando, Fla.

[73] Assignee: FMC Corporation, Chicago, Ill.

[21] Appl. No.: 856,619

[22] Filed: Apr. 25, 1986

[51] Int. Cl.$^4$ .............................................. B65G 41/00
[52] U.S. Cl. .................................... 198/632; 198/836;
 5/430; 182/113; 403/61; 403/85
[58] Field of Search ............... 198/632, 836, 300, 337,
 198/318; 5/425, 428, 429, 430; 182/113, 152;
 403/61, 85, 116

[56] References Cited

U.S. PATENT DOCUMENTS

| 854,253 | 5/1907 | Stoops | 182/113 |
| 2,873,987 | 2/1959 | Larson | 403/61 |
| 4,217,670 | 8/1980 | Sciongay, Sr. et al. | 5/430 X |
| 4,620,629 | 11/1986 | Dean | 198/836 |

Primary Examiner—Joseph E. Valenza
Assistant Examiner—Jonathan D. Holmes
Attorney, Agent, or Firm—Ronald C. Kamp; Richard B. Megley

[57] ABSTRACT

An improved side guide for an aircraft belt loader having a vertical plate member positioned adjacent to and extending along side the belt conveyor frame which plate is supported by a pair of links, one of which has a slot and a cam surface terminating in a notch. A pin attached to the plate member extends through the slot and a lug affixed to the plate member engages the cam surface as the plate member is moved laterally to elevate the plate member, the lug dropping into said notch to lock said plate member in an elevated position.

5 Claims, 3 Drawing Sheets

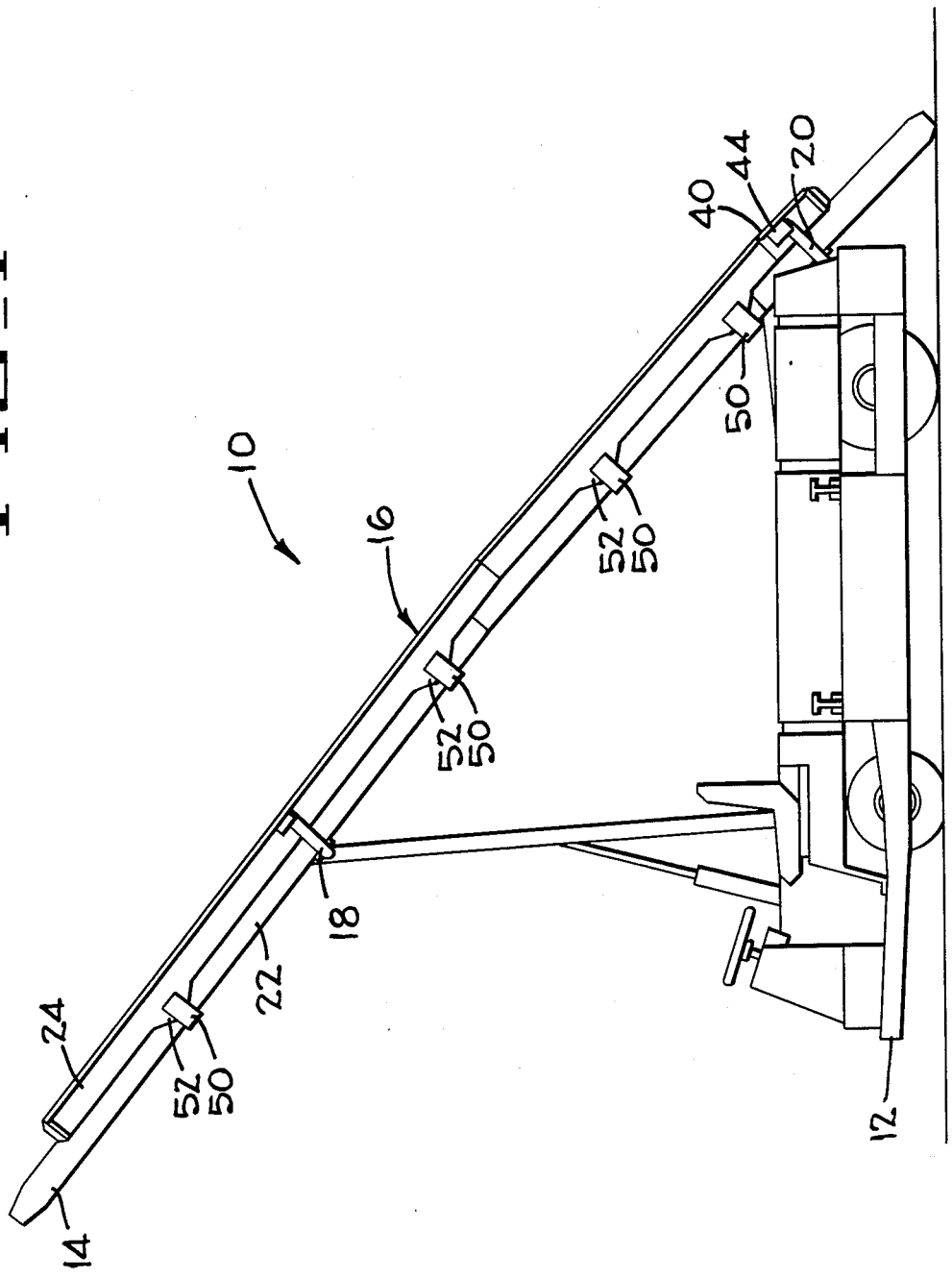

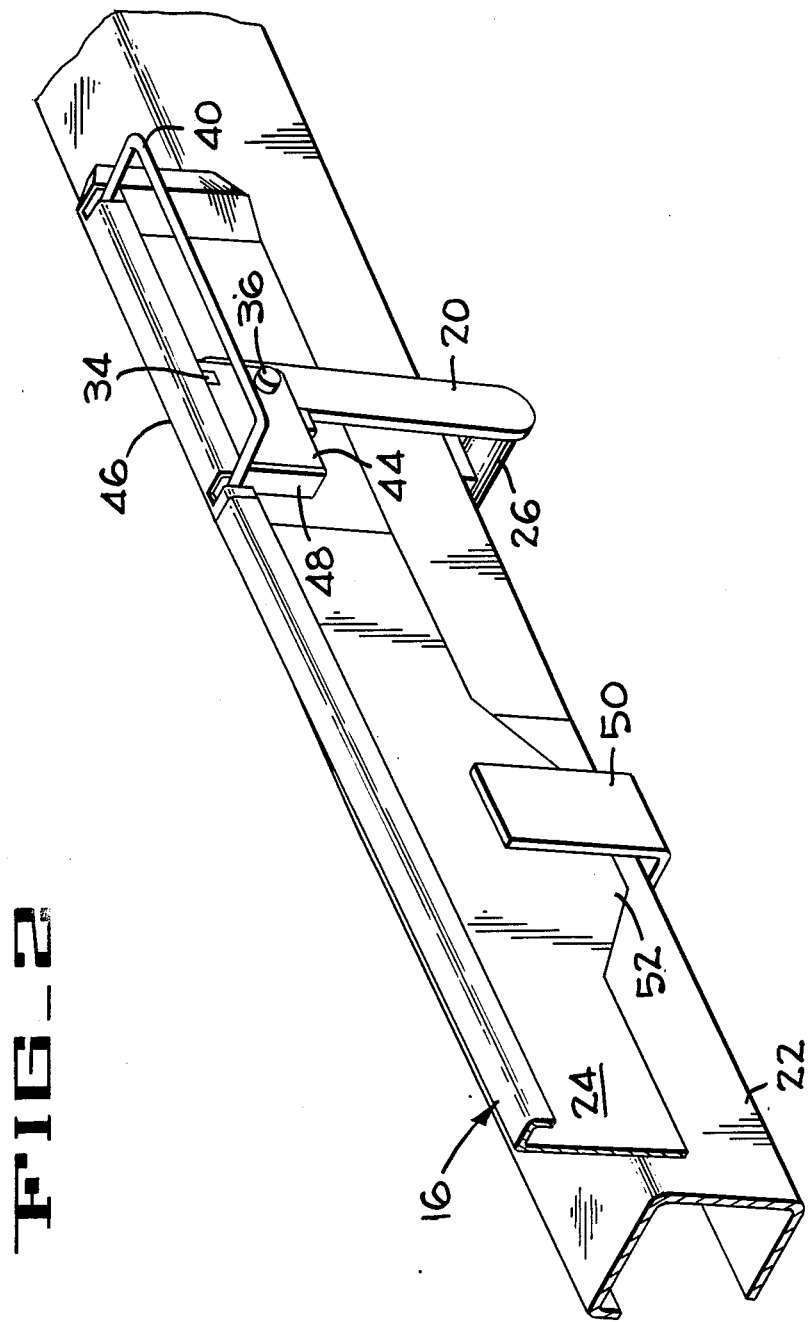

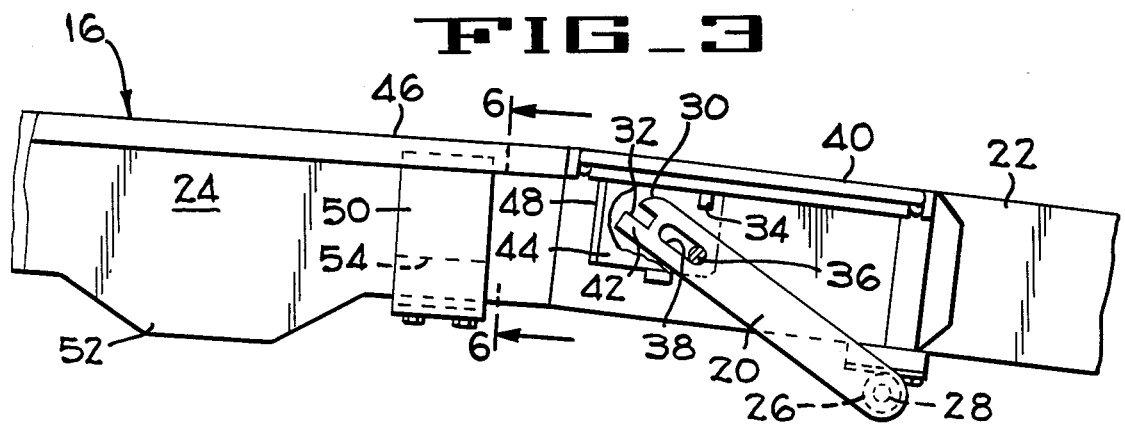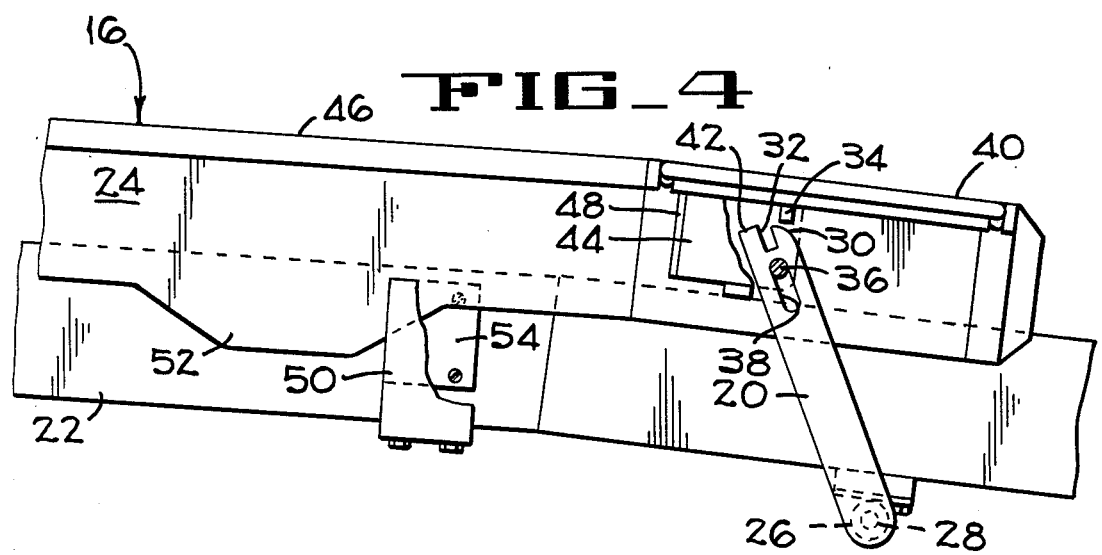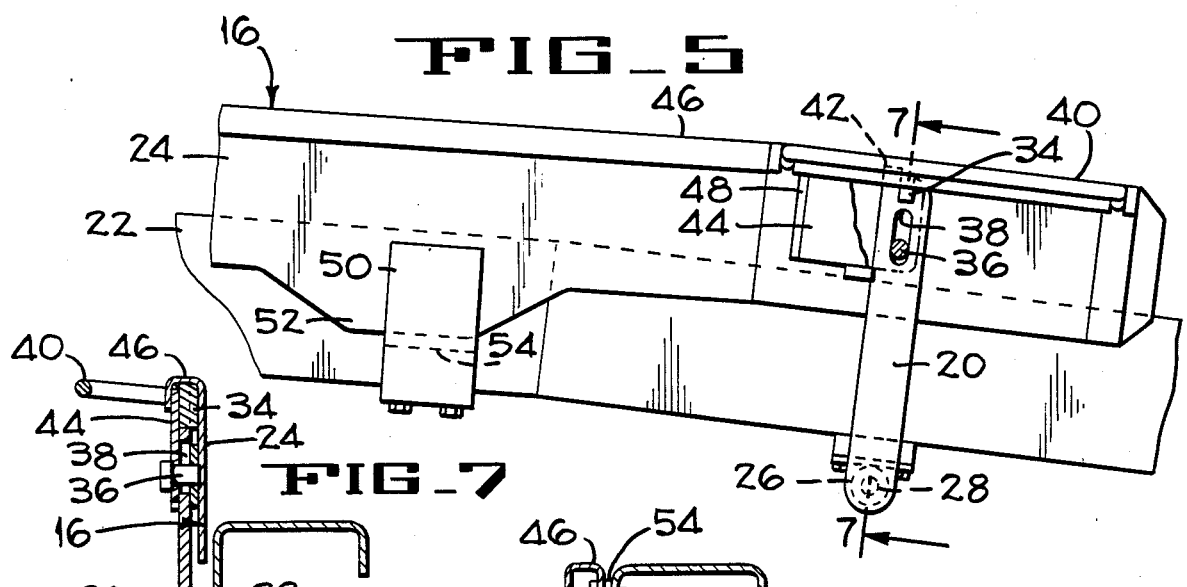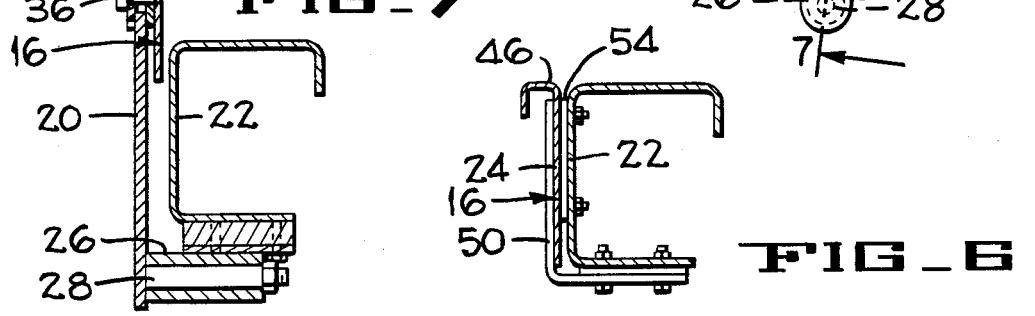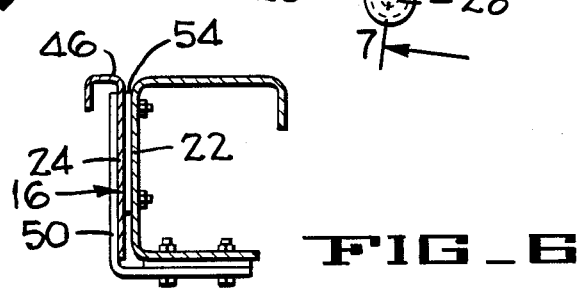

SIDE GUIDE FOR AIRCRAFT BELT LOADER

This invention relates to guides that are positionable along one side of the belt conveyor on an aircraft belt loader to assist in the placement of luggage and other parcels and to prevent them from falling from the conveyor.

Side guides have been provided on aircraft belt loaders in the past. These prior art side guides have been difficult to operate, either in the physical effort required or in the sequence of movements needed to raise and lower the side guide, and/or have employed complex mechanisms increasing both the cost of manufacture and the maintenance needed to maintain an acceptable operating condition.

The present invention provides a side guide for an aircraft belt loader which overcomes the short comings of the prior art, which is rugged and relatively rigid to the imposition of side loads, which requires relatively few components, which may be raised and lowered with one hand, and which is relatively simple to manufacture and maintain.

These and other attributes of the present invention, and many of the attendant advantages thereof, will become more readily apparent upon a perusal of the following description and the accompanying drawings, wherein:

FIG. 1 is a side elevational view of an aircraft belt loader incorporating a side guide according to the present invention;

FIG. 2 is an isometric view of a portion of the side guide shown in FIG. 1;

FIG. 3 is a side elevational view, with portions broken away, of the side guide portion shown in FIG. 2;

FIG. 4 is a side elevational view similar to FIG. 3 showing the side guide at a position intermediate its raised and lowered positions;

FIG. 5 is a view similar to FIGS. 3 and 4 but showing the side guide in its raised position;

FIG. 6 is a cross-sectional view taken on line 6—6 of FIG. 3; and

FIG. 7 is a cross-sectional view taken on line 7—7 of FIG. 5.

Referring to FIG. 1, there is shown an aircraft belt loader, indicated generally at 10, having a wheeled frame 12 on which a belt conveyor 14 is mounted in a conventional manner for selective angular orientation and elevation. A side guide 16 is supported by a pair of links 18 and 20. The forward link 18 is pivoted at its lower end to the frame 22 of the conveyor 14 and at its upper end to the vertical plate member 24 of the side guide 16. The link 20 is oriented essentially parallel to the link 18 so that the side guide remains parallel to the belt conveyor 14 as it is raised and lowered. As best seen in FIGS. 2-5, the lower end of the link 20, similar to the link 18, is rotatably secured to the underneath side of the conveyor frame 22 by bearing mount 26 so that it may rotate about the axis of the pin 28 secured to the link 20. The upper end of the link 20 is provided with an arcuate cam surface 30 and a notch 32 which is engageable by a lug 34 attached to the plate member 24. A pin 36 attached to the member 24 extends through a slot 38 in the link 20. In the lowered position, as shown in FIG. 3, the pin 36 rests at the bottom of the slot 38. A rearward force, i.e., toward the right as viewed in FIGS. 3-5, applied to U-shaped handle 40 causes the link 20 to rotate and the pin 36, bearing on the bottom of slot 38 will cause the side guide to elevate relative to the frame 22. When the link 20 has rotated a sufficient amount, the cam surface 30 will engage the lug 34 and further movement of the side guide toward the right will cause the side guide to be elevated further relative to the frame 22, with the pin 36 being moved upward in the slot 38. Once the notch 32 is aligned with the lug 34, the lug 34 will drop into the notch 32 latching the side guide in its raised position, as shown in FIG. 5. The side guide is returned to its lowered position by lifting the handle 40 to extract the lug 34 from the notch 32, and then moving the handle 40 to the left. The link 20 will rotate to the position shown in FIG. 3. To prevent the lug 34 from being moved past the notch 32, as the side guide is moved toward the right, an extension 42 is provided on the side of the notch 32 opposite the cam surface 30. The extension 42 is capable of engaging or contacting the lug 34 when the pin 36 is at the top of the slot 38, thus insuring that the side guide can not be moved to the right beyond the point at which the notch 32 is aligned with the lug 34. In order to minimize the possibility of fingers being pinched by the mechanism at the top of the link 20, a shield 44 is secured to the flange 46 extending along the upper edge of the plate member 24 and covers this mechanism. A side shield 48 secured between the plate member 24 and the shield 44 assists in this protection. The shields 44 and 48 also strengthen the structure and permit the pin 36 to be supported in simple bending, rather than being cantilevered, by extending through the shield 44.

The plate member 24 has, as previously mentioned, a flange 46 extending along its upper edge which increases its rigidity when subjected to side loads. To further minimize side deflection, a plurality of brackets 50 are secured to the underneath side of the conveyor frame 22 and extend upward parallel to the side wall of the frame 22. Downward projections 52 are provided on the plate member 24 at positions to engage each of the brackets 50. The projections 52 are utilized only to reduce the weight of the side guide 16. The projections 52 on plate member 24 engages the complementary brackets 50 to prevent deflection and to maintain the side guide in close proximity to the frame 22. In order to reduce frictional resistance to movement, a block 54 of low friction material, such as nylon, for example, is secured to the side wall of the conveyor frame 22 and engages plate member 24. These blocks 54 also serve to provide a slight spacing between the frame 22 and the side guide 16 to reduce the effort required to shift the side guide 16.

While a preferred embodiment of the present invention has been illustrated and described herein, various changes and modifications may be made therein without departing from the spirit of the invention as defined by the scope of the appended claims.

What is claimed is:

1. In an aircraft belt loader having a belt conveyor mounted on a frame; an improved side guide comprising:

a vertical plate member positioned adjacent to and extending along one side of said frame;

a first link pivotally attached at one of its end to said frame and at the other of its ends to said plate member and arranged when caused to pivot to move said plate member between a lowered position and an elevated position in which it may function as a guide;

a second link pivotally connected at one of its ends to said frame and having a slot therein adjacent the other of its ends;

a pin attached to said plate member and extending through said slot;

a cam surface terminating in a notch formed on said other end of said link;

a lug sized to be received in said notch affixed to said plate member and engageable with said cam surface as said first and second link means are pivoted to urge said plate member toward its elevated position;

the engagement of said lug with said cam surface causing said pin to rise along said second link in said slot until said lug is aligned with said notch when gravity will cause said lug to drop into said notch thereby locking said plate member in its elevated position.

2. The invention according to claim 1, wherein said second link is provided with an extension on the side of said notch opposite said cam surface capable of contact with said lug when said lug is aligned with said notch to assure that the lug will drop into said notch.

3. The invention according to claim 1 and further comprising:

a plurality of brackets attached to said frame and extending upward along side of said plate member; and a flange formed along the upper edge of said plate member to increase the resistance to deflection of said plate member.

4. The invention according to claim 3 and further comprising:

a rib block of low friction material attached to said frame opposite each of said brackets and engageable by said plate member to reduce the force required to move said plate member.

5. The invention according to claim 3, wherein said plate member is provided with downward projections positioned to be adjacent each of said brackets when said plate member is in its elevated position whereby the weight of said plate member may be reduced without affecting the deflection resistance provided by said brackets.

* * * * *